(No Model.)
D. GOODWILLIE.
EGG CARRIER.
No. 266,618. Patented Oct. 31, 1882.
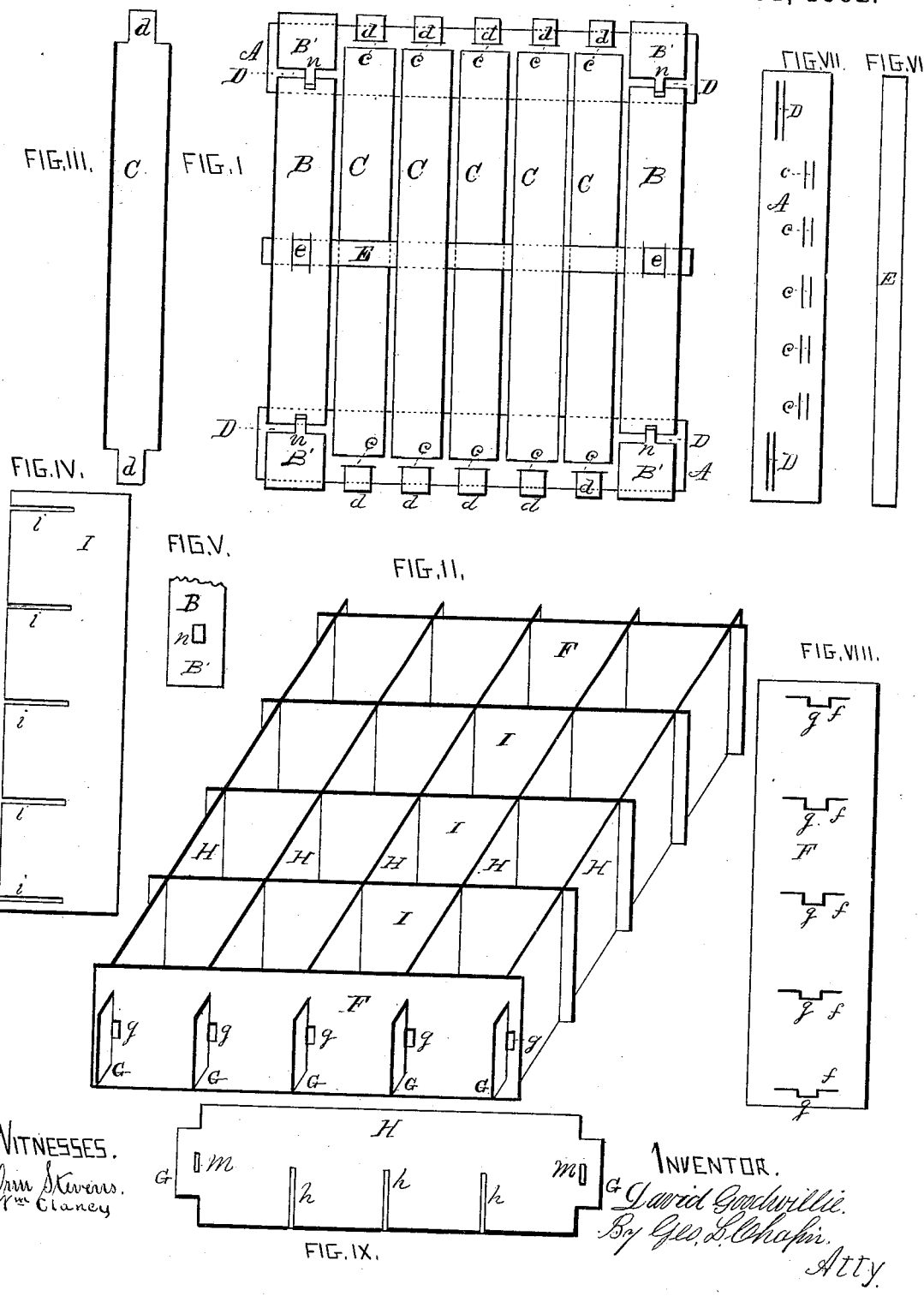

UNITED STATES PATENT OFFICE.

DAVID GOODWILLIE, OF CHICAGO, ILLINOIS.

EGG-CARRIER.

SPECIFICATION forming part of Letters Patent No. 266,618, dated October 31, 1882.

Application filed March 6, 1882. (No model.)

*To all whom it may concern:*

Be it known that I, DAVID GOODWILLIE, of Chicago, in the county of Cook and State of Illinois, have invented a new and useful Improvement in Egg-Carriers, of which the following is a specification, reference being had to the accompanying drawings, illustrating the improvement, in which—

Figure I is a plan or top view of the bottom of my improved egg-carrier removed from the partitioned part. Fig. II is a perspective representation of said partitioned part. Fig. III represents one of the strips of the bottom removed from the other parts. Fig. IV shows one of the interlocking cross-strips of partitioned part. Fig. V shows one end of the bottom piece, B, and the tongue formed thereon. Fig. VI shows the center strip of the bottom. Fig. VII shows one of the under strips of the bottom; Fig. VIII, one of the exterior strips of the partitioned strips; Fig. IX, a view of one of the strips which pass through strips F and interlock with strips I.

The nature of the present invention consists in a slatted bottom, a part of whose upper strips are tenoned through loops in the main lower strips, so as to hold both sets of strips together and the lower strips from sliding inward, and in outer upper strips attached to the lower main strips by loops and tongues, so as to prevent the lower strips from sliding outward or off from the tenoned strips.

A represents the lower exterior strips of the bottom, which are provided with loops c c, formed by cutting slots through A on either side of parts c c, and with loops D formed in the same manner. The strips C C have tenons d d formed on their ends to pass through or under loops c. The shoulders of the tenons, bearing against the inner edges of the loops, prevent the strips A from sliding inward. The outer top strips, B, pass through loops D D, also formed in strips A, and hold the strips A from sliding outwardly by means of tongues n n, formed on the outsides of loops D, and projecting over them inwardly. The forms of the tongues n n on the strips B are more clearly shown at Fig. 5. A central strip, E, is looped onto the strips B transversely and interlaced with the strips C. It may, however, be looped onto the strips C, the same as onto strips B, by loops e e, to hold the bottom level.

F represents side strips for the carrier, formed by mortises f for the tenons G to pass through, and tongues g to pass through the slots m in the tenons and hold the shoulders of the tenons firmly to the strips F. The central portion of the partitions are connected by the halving slots i f, similar to the Stevens case, as shown at I H. The ends, however, of strips I may be tenoned through the outer strips, H, similarly as the strips H are attached to strips F. This will form a carrier which will not split out at the ends, and will be cheaper and more flexible than carriers made of straw-board, and less liable to absorb and retain foul gases.

The partitioned part has been shown and described to complete one section of the carrier; but it is not considered a part of this invention.

I claim and desire to secure by Letters Patent—

The wooden bottom for egg-carriers, consisting of strips C, looped onto and shouldered against the strips A, so that the latter cannot slide inward, and the strips B, looped onto the strips A, and, by means of tongues n n locking over loops D D, holding the strips A from sliding outward, as and for the purpose specified.

DAVID GOODWILLIE.

Witnesses:
G. L. CHAPIN,
F. B. ABBOTT.